United States Patent
Clinton

(10) Patent No.: US 8,915,173 B2
(45) Date of Patent: Dec. 23, 2014

(54) TOOL FOR HANDLING A CARTRIDGE

(71) Applicant: David L. Clinton, Carlsbad, CA (US)

(72) Inventor: David L. Clinton, Carlsbad, CA (US)

(73) Assignee: Darton International, Inc., Carlsbad, CA (US)

(*) Notice: Subject to any disclaimer, the term of this patent is extended or adjusted under 35 U.S.C. 154(b) by 0 days.

(21) Appl. No.: 13/829,654

(22) Filed: Mar. 14, 2013

(65) Prior Publication Data

US 2014/0069267 A1    Mar. 13, 2014

Related U.S. Application Data

(60) Provisional application No. 61/699,772, filed on Sep. 11, 2012.

(51) Int. Cl.
*F42B 33/10* (2006.01)
*B25J 1/00* (2006.01)

(52) U.S. Cl.
CPC ... *F42B 33/10* (2013.01); *B25J 1/00* (2013.01)
USPC .................. 86/44; 86/24; 81/423; 81/353

(58) Field of Classification Search
USPC ............. 86/23, 24, 44, 1.1; 81/352, 353, 418, 81/419, 420, 421, 422, 423, 424, 424.5, 81/426, 426.5; 42/108
See application file for complete search history.

(56) References Cited

U.S. PATENT DOCUMENTS

| | | | |
|---|---|---|---|
| 739,151 A | 9/1903 | Chick | |
| 835,351 A | 11/1906 | Farnell | |
| 1,617,703 A | 2/1927 | Christianson | |
| 2,443,807 A | 6/1948 | Smiley | |
| 2,977,618 A | 4/1961 | Brisbin | |
| 3,025,743 A | 3/1962 | Cecchi | |
| 3,745,873 A * | 7/1973 | Lee | 86/1.1 |
| 3,898,908 A | 8/1975 | Isenhower et al. | |
| 4,425,833 A | 1/1984 | Purdie | |
| 5,309,813 A | 5/1994 | Henley | |
| 5,316,512 A | 5/1994 | Ell | |
| 5,649,464 A | 7/1997 | Gracey | |
| 5,680,697 A * | 10/1997 | Bever | 29/764 |
| 5,698,809 A | 12/1997 | Holt | |
| 5,730,033 A * | 3/1998 | Mitrowski | 81/53.11 |
| 5,788,429 A | 8/1998 | Gracey | |
| 5,991,997 A | 11/1999 | Schley et al. | |
| 6,240,815 B1 * | 6/2001 | Huang | 81/328 |

(Continued)

FOREIGN PATENT DOCUMENTS

| | | | |
|---|---|---|---|
| DE | 3829311 A | * | 3/1990 |
| DE | 3829311 A1 | | 3/1990 |

OTHER PUBLICATIONS

Ford, Frank, "Soft Jaw Pliers", HomeShopTech: Replaceable jaws 2009, downloaded from www.frets.com website on Aug. 20, 2012, 6 pages.

*Primary Examiner* — James S Bergin

(74) *Attorney, Agent, or Firm* — Kilpatrick Townsend & Stockton LLP

(57) ABSTRACT

A cartridge retention tool may be used for restraining a spent cartridge during primer pocket cleaning. The tool may have jaws that may be sized to approximately fit the cartridge and secure it from moving during the cleaning process. The tool may employ mechanical leverage to reduce the amount of force required to restrain the cartridge within the jaws.

10 Claims, 14 Drawing Sheets

(56) References Cited

U.S. PATENT DOCUMENTS

| | | |
|---|---|---|
| 6,260,463 B1 | 7/2001 | Brand et al. |
| 6,286,358 B1 | 9/2001 | Beetz et al. |
| 6,336,386 B1 * | 1/2002 | Lee ................................. 81/328 |
| D464,135 S | 10/2002 | Hawkins |
| 6,477,925 B2 * | 11/2002 | Lin ................................. 81/423 |
| 6,484,616 B1 | 11/2002 | Giraud |
| 6,662,690 B1 | 12/2003 | Ploeger |
| 7,172,628 B2 | 2/2007 | Lamprich et al. |
| D563,745 S | 3/2008 | DeVries et al. |
| 2008/0302281 A1 | 12/2008 | Bernard et al. |
| 2011/0232467 A1 | 9/2011 | Keska |

* cited by examiner

TOOL FOR HANDLING A CARTRIDGE

CROSS-REFERENCE TO RELATED APPLICATIONS

This application claims the benefit of priority of co-pending U.S. Provisional Patent Application Ser. No. 61/699,772 entitled "TOOL FOR HANDLING A CARTRIDGE," to David L. Clinton, filed Sep. 11, 2012. Priority of the filing date of Sep. 11, 2012 is hereby claimed, and the disclosure of the above-referenced patent application is hereby incorporated by reference.

BACKGROUND

This application claims priority to U.S. Application No. 61/699,772 filed Sep. 11, 2012 and entitled "Tool for Handling a Cartridge" of which is referred to and incorporated herein by reference in its entirety.

Reloading spent ammunition is a common way of reducing the costs of shooting and may also provide the ability to create custom ammunition for specific needs. Center-fire rifle and pistol ammunition are particularly suited to reloading. Reloading may involve numerous processes or tasks, including removal of spent primer from a cartridge, cleaning, resizing, installing a new primer, adding a powder charge, and installing a bullet in the cartridge. One particularly difficult step in the reloading process may be cleaning the burnt powder residue (i.e., from the spent primer) from the primer pocket of the brass cartridge without damaging the relatively delicate cartridge. Myriad equipment has been developed for the cleaning process, however, removal of powder residue from the primer pocket of the cartridge remains a laborious and difficult task.

Therefore, improved methods and equipment for removal of powder residue from the primer pocket of cartridges are desired.

SUMMARY

A cartridge handling tool is disclosed. A hand-held tool in accordance with the disclosure comprises of a pair of lever arms, each lever arm having a handle portion located substantially at one end and a working portion located substantially at another end. The tool further includes a pair of jaws, one jaw for each lever arm, each jaw having an attachment face and a receiving face on opposite sides of the jaw, and a clamping surface that extends between the attachment face and receiving face. One jaw of the pair of jaws is attached to each lever arm such that the attachment face of each jaw is removably attached to the working portion of each lever arm. The lever arms are pivotally coupled such that the lever arms move between an open position in which the jaws are spaced apart and a closed position in which the jaws are closer together and the clamping surfaces of the jaws are substantially parallel. The clamping surface of each jaw comprises a depression in the shape of a half cylinder, each depression having a longitudinal axis oriented perpendicular to the attachment face and the receiving face, and each depression having a radius that approximately matches a radius of the cartridge. The hand-held tool may have a registration feature disposed at a distance from the receiving face of the jaw that is less than a length of the cartridge. The jaws may be removably attached to the lever arms such that jaws fitting different cartridges can be used interchangeably on the lever arms.

Other features and advantages of the present invention should be apparent from the following description of the preferred embodiments, which illustrate, by way of example, the principles of the invention.

DETAILED DESCRIPTION

In the following description, various embodiments are described. For purposes of explanation, specific configurations and details are set forth in order to provide a thorough understanding of the embodiments. It will also be apparent to one skilled in the art that the present invention can be practiced without the specific details described herein. Furthermore, well-known features may be omitted or simplified in order not to obscure the embodiment being described.

The hand-held cartridge handling tool disclosed herein is suitable for handling a cartridge such as a spent cartridge used for reloading ammunition. The tool is useful for performing reloading tasks on a cartridge, such as removal of spent primer from the cartridge, cleaning, resizing, installing a new primer, adding a powder charge, installing a bullet on the cartridge, and the like. The tool improves efficiency and reduces the labor involved in the reloading process. The tool is suited, for example, for safely holding the cartridge without damage for cleaning the burnt powder residue (i.e., spent primer) from the primer pocket of the brass cartridge.

Figure 1B:
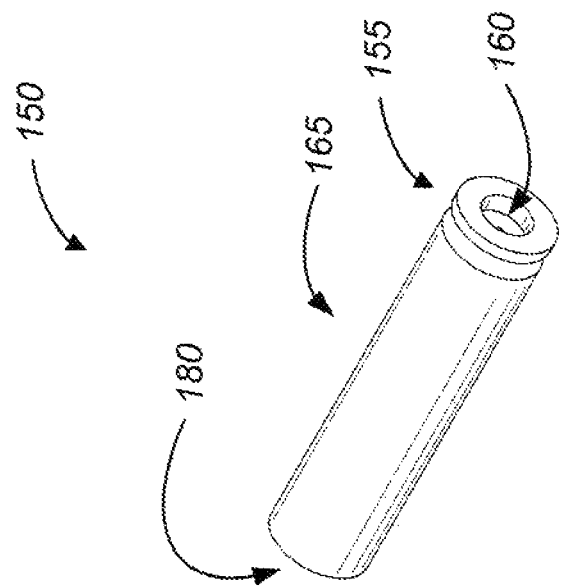
FIG. 1B is a perspective view of a cartridge to be used in accordance with the tool embodiments disclosed herein.
Figure 1A:
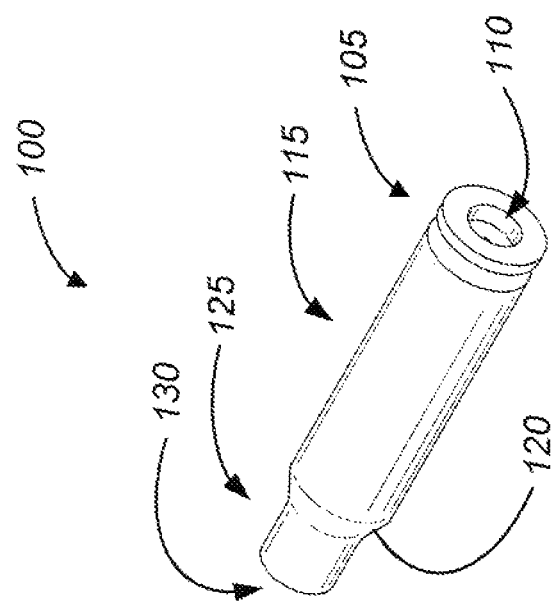
FIG. 1A is a perspective view of a cartridge to be used in accordance with the tool embodiments disclosed herein.

FIG. 1A shows a perspective view of an exemplary shouldered center-fire cartridge 100. The cartridge 100 has a head portion 105 with a primer pocket 110 disposed in the end of the head portion. The cartridge also has a body portion 115 and a neck portion 125. In between the body portion and the neck portion may be a shoulder 120 that transitions from a larger body portion diameter to a smaller neck portion diameter. At the end of the cartridge 100 there may be an opening 130 for receiving a bullet (not shown).

FIG. 1B shows a perspective view of an exemplary non-shouldered center-fire cartridge 150. The cartridge 150 has a head portion 155 with a primer pocket 160 disposed in the end of the head portion. The cartridge also has a body portion 165 and an opening 180 at the end of cartridge 150 for receiving a bullet (not shown). The illustrated cartridges 100, 150 are shown for exemplary purposes only and myriad cartridges having different geometries may be used without departing from the invention.

The cartridges 100, 150 are illustrated in a condition prepared for reloading, after the spent primers have been removed from the primer pockets 110, 160. The removal of a spent primer is typically an initial operation performed in the reloading process. The next operation in the reloading process may comprise cleaning the primer pocket 110, 160 of burnt powder residue, typically using a cleaning tip or tool (not illustrated). Two primary methods of removing residue from the primer pockets include: (1) using a brush that may have stiff wire bristles that are disposed within the primer pocket, whereupon either the brush or the cartridge is rotated; and (2) using a reamer that may have a sharp cutting edge that is placed within the primer pocket, whereupon either the cartridge or the reamer is rotated. Some cleaning tools are semi-automated versions in which a brush or a reamer cleaning tip is rotated while the respective cartridges 100, 150 are held, restrained from rotation. The tool reduces the strength and strain that must be applied to hold the cartridge while the cleaning tip is rotated in the primer pocket.

To effectively remove powder deposits from within the primer pockets 110, 160, the respective cartridges 100, 150 may need to be aligned with the cleaning tip and may need to be moved under control to effectively remove the powder residue from all the interior surfaces of the primer pockets. This control may be best performed by hand. Holding onto a brass cartridge by hand and controlling the cartridge while the cleaning tip is rotated may be a difficult task, made even more difficult when cleaning numerous cartridges one after the other over an extended time. Furthermore, in some reloading processes, a prior operation in reloading the cartridges may involve adding lubrication to the cartridges for a resizing operation. Lubrication may be important for a proper resizing operation. The addition of lubricant to the cartridge may make the task of restraining the cartridge from rotation, and properly controlling it by hand, even more difficult.

Figure 2:
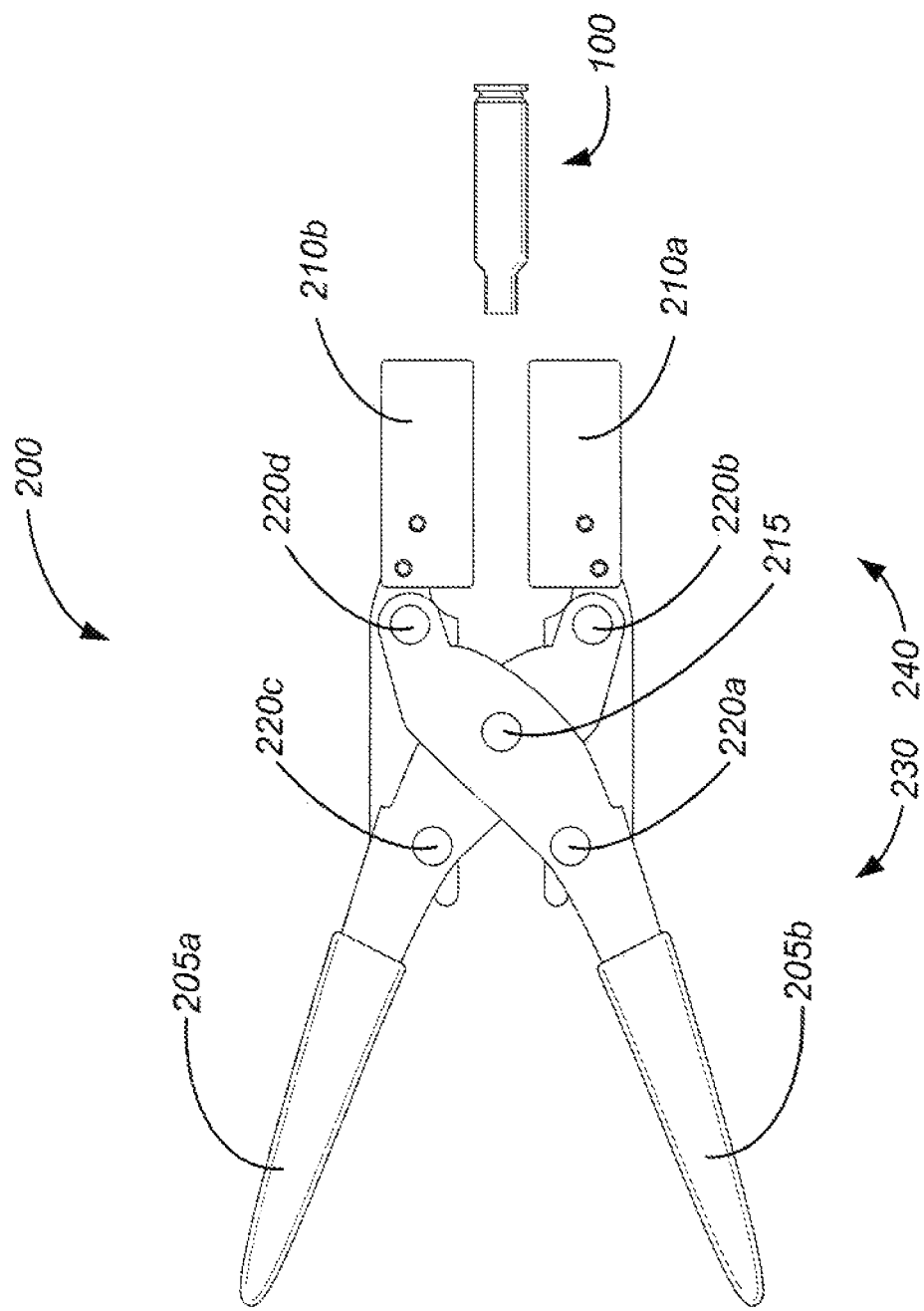
FIG. 2 is a view of a tool for handling a cartridge in accordance with the embodiments disclosed herein, with lever arms in an open position.
Figure 3:
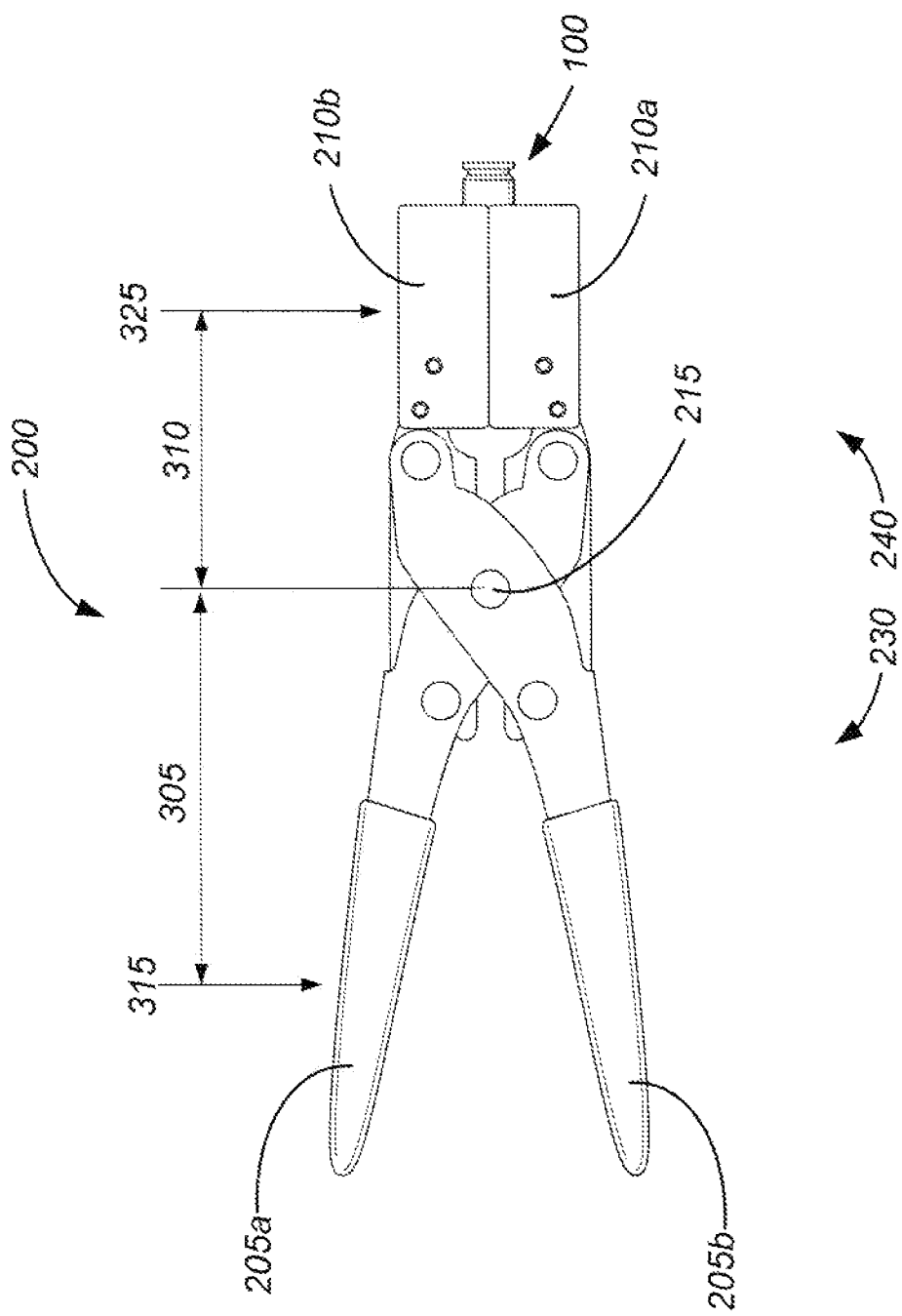
FIG. 3 is a view of the tool illustrated in FIG. 2 for handling a cartridge, with lever arms in a closed position.

FIG. 2 illustrates a cartridge retention tool 200 constructed in accordance with this disclosure that may be used for holding either one of the cartridges 100, 150 during cleaning of the primer pocket 110. In this description, a discussion of features with respect to one type of cartridge 100, 150 should be understood to apply equally to the other, unless stated otherwise. In FIG. 2, the tool 200 is illustrated in the open position, ready to receive a cartridge for a cleaning operation. FIG. 3 illustrates the tool 200 in the closed position. The tool may be equipped with a pair of lever arms 205a, 205b that are pivotally connected with a primary pivot 215. The lever arms 205a, 205b may have a handle portion 230 at one end, on one side of the primary pivot 215, and may have a working portion 240 at the other end, on the other side of the primary pivot. A pair of jaws 210a, 210b may be removably attached from the lever arms, one of the jaws to the working portion 240 of each lever arm. In this description, a feature described for one of the lever arms or one of the jaws will be understood to apply equally to the other lever arm or jaw, unless indicated otherwise. Thus, each of the lever arms 205a, 205b includes a handle portion 230 and a working portion 240.

The jaws 210a, 210b may be configured to effectively grip the cartridge 100, 150 without damaging the cartridge. This feature will be described in greater detail below. The tool 200 may be equipped with one or more secondary pivots or slides 220a, 220b, 220c, 220d that may enable the jaws 210a, 210b to remain substantially parallel when the lever arms 205a, 205b are moved from the open position of FIG. 2 to the closed position illustrated in FIG. 3. In an alternative embodiment, the lever arms 205a, 205b may be pivotally connected with only one primary pivot and the jaws 210a, 210b may not remain substantially parallel when the lever arms are moved from the open position to the closed position. That is, instead of maintaining a parallel orientation through movement between the open and closed positions, the lever arms may move in a more arcuate path.

FIG. 3 shows that when the handle portions 230 of the lever arms 205a, 205b are brought towards one another, the respective working portions 240 of the lever arms are also brought towards one another, because of the primary pivot 215. More specifically, moving the handle portions 230 closer together also moves the jaws 210a, 210b closer together. The jaws 210a, 210b may be configured to securely retain or hold the cartridge 100 such that the cartridge cannot translate or rotate when the tool 200 is in the closed position. Furthermore, the tool 200 may employ mechanical leverage to reduce the force required on the handle portions to maintain adequate cartridge gripping force on the jaws, so that cartridge rotation during cleaning is prevented. More specifically, the basic leverage formula of force times distance may be employed to meet the desired ratio of applied hand force to jaw gripping force. Essentially, a handle force 315 times a handle distance 305 may approximately equal a jaw force 325 times a jaw distance 310. If the jaw distance 310 is less than the handle distance 305 then the jaw force 325 may be proportionally greater than the handle force 315. For instance, if the handle distance 305 is twice that of the jaw distance 310, then the jaw force 325 applied on the jaws 210a, 210b may be approximately twice the applied handle force 315. Other pivot locations and combinations of pivots, slides and lever arms may be employed without departing from the invention.

In some embodiments, a "hold open" spring may be incorporated to move the lever arms 205a, 205b into the open position when there is no force applied to the handle portions of the lever arms. In some embodiments, the lever arms may have a lock that secures them in the closed position. The lock feature may also be used for maintaining the cartridge 100 in the closed jaws 210a, 210b. In some embodiments, the lock is an over-center type lock and in other embodiments the lock is a ratcheting or latch-type of lock. Myriad locking devices may be employed without departing from the invention.

Figure 4B:
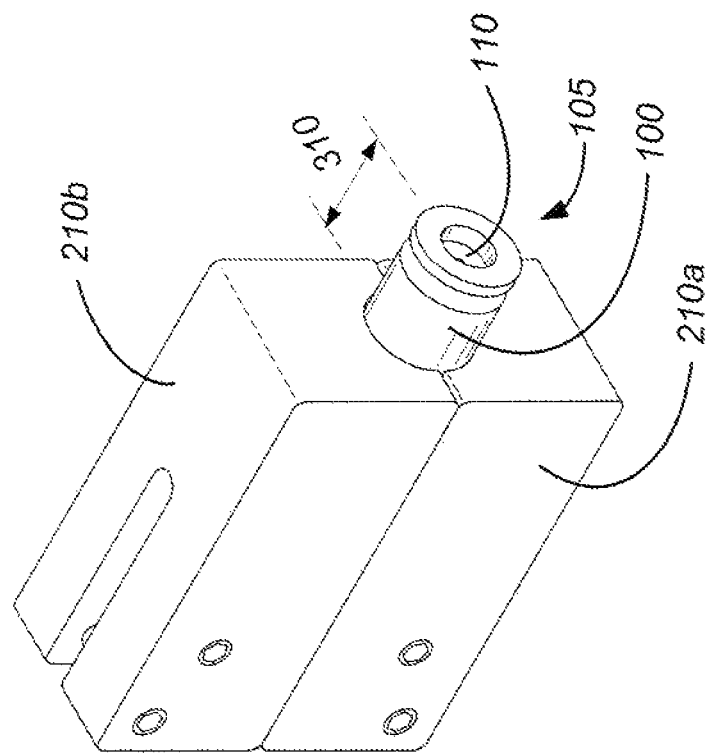
FIG. 4B is a perspective view of a pair of jaws and a cartridge in accordance with the embodiments disclosed herein.
Figure 4A:
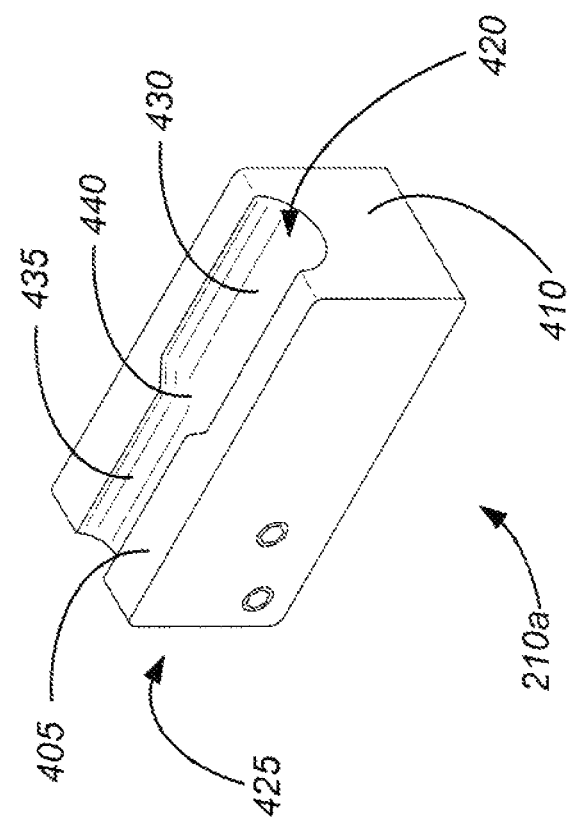
FIG. 4A is a perspective view of a jaw in accordance with the embodiments disclosed herein.

Example jaws are shown in greater detail in FIG. 4A. One of the jaws 210a may have an attachment face 425 that attaches to the working portion 240 (see FIG. 3) of the lever arm 205a. The jaw 210a may also have a clamping surface 405 that may have a depression 420 that approximately matches a profile of the cartridge 100 (see FIG. 1A). The depression 420 may be considered to have a longitudinal axis along which two half-cylinders are disposed. A first half-cylinder 430 may be disposed proximate the receiving face 410 and may have a radius that approximately matches a radius of the body portion 115 (see FIG. 1A) of the cartridge 100. A second half-cylinder 435 may be disposed towards the attachment face 425 and may have a radius that approximately matches a radius of the neck portion 125 (see FIG. 1A) of the cartridge 100. The first half-cylinder and the second half-cylinder may be joined by a registration feature 440.

The registration feature 440 may act as a stop to the cartridge 100 that prevents the cartridge from sliding towards the attachment face 425 when the lever arms are in the closed position for holding the cartridge during cleaning. More specifically, as illustrated in FIGS. 4A and 4B, the registration feature 440 may be located a distance from the receiving face 410 that is less than a length of the cartridge 100, such that a predetermined exposed length 310 of the head portion 105 of the cartridge 100 remains outside of the jaw 210a and the matched opposing jaw 210b (jaw 210b is a matched opposing jaw with similar features as jaw 210a) when the tool is in the closed position. Thus, when a longitudinal force is applied to the primer pocket 110 during cleaning or other operations, the cartridge 100 may be prevented from sliding towards the attachment face 425. In some embodiments, the exposed length 300 is between five-eighths of an inch and one-fourth of an inch. In some embodiments, the exposed length is between three-eighths of an inch and one-half of an inch, while in other embodiments the exposed length is approximately seven-sixteenths of an inch. The registration feature 440 may be of any design and may simply be a sharp corner rather than a tapered edge. The registration feature may also be disposed on the second half-cylinder 435. Myriad registration features may be used without departing from the invention.

Figure 5:
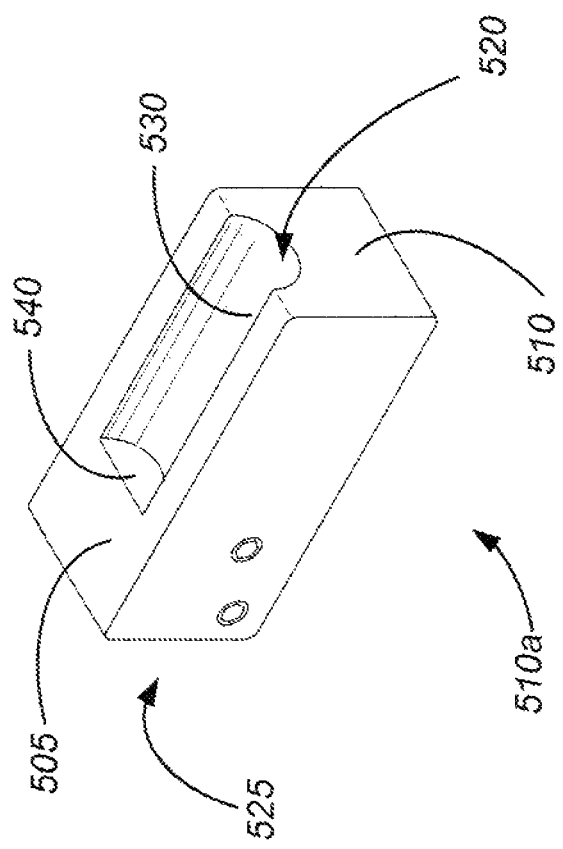
FIG. 5 is a perspective view of a jaw in accordance with the embodiments disclosed herein.

An alternative embodiment of a jaw 510a is illustrated in FIG. 5. The jaw 510a may be used with a matched opposing jaw. The jaw 510a may have an attachment face 525 that may attach to the working portion 240 (see FIG. 3) of the lever arm 205a. The jaw 510a may also have a clamping surface 505 that has a depression 520 that may approximately match a profile of the cartridge with which the tool is being used, such as either shouldered or non-shouldered cartridge 100, 150 (see FIGS. 1A, 1B). The depression 520 may be considered to have a longitudinal axis along which the half-cylinder 530 is disposed. The half-cylinder 530 may be disposed proximate the receiving face 510 and may have a radius that approximately matches the radius of the body portion 115 (see FIG. 1A) of the shouldered cartridge 100 or it may have a radius that approximately matches the body portion 165 (see FIG. 1B) of the non-shouldered cartridge 150. A registration feature 540 may act as a stop to the cartridge 100, 150 from sliding towards the attachment face 525. More specifically, the registration feature 540 may be located a distance from the receiving face 510 that is less than a length of the cartridges 100, 150 such that an exposed length 310 (see FIG. 4B) of the head portion 105, 155 of the cartridges 100, 150 remains outside of the jaw 510n and a matched opposing jaw. Thus, when a longitudinal force is applied to the primer pocket 110, 160 during cleaning or other operations, the cartridges 100, 150 may be prevented from sliding towards attachment face 525. The registration feature may be of any design. Myriad registration features may be used without departing from the invention.

Figure 6:
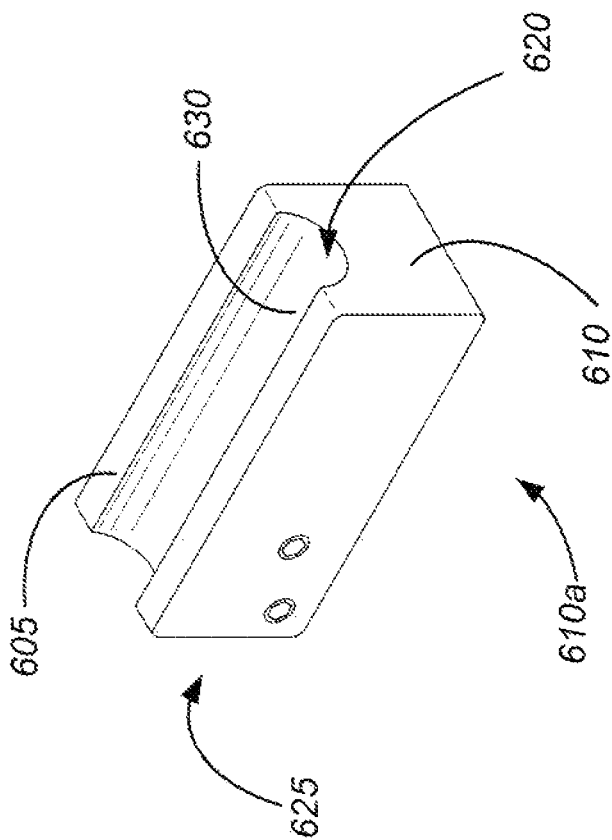
FIG. 6 is a perspective view of a jaw in accordance with the embodiments disclosed herein.

FIG. 6 shows another embodiment of a jaw 610a. The jaw 610a may be used with a matched opposing jaw. The jaw 610a may have an attachment face 625 that may attach to the working portion 240 (see FIG. 3) of the lever arm 205a. The jaw 610a may also have a clamping surface 605 that may have a depression 620 that approximately matches the profile of the cartridge 100, 150 (see FIG. 1A). The depression 620 may be considered to have a longitudinal axis along which a half-cylinder is disposed. The half-cylinder 630 may be disposed proximate the receiving face 610 and may have a radius that approximately matches the radius of the body portion 115 (see FIG. 1A) of the shouldered cartridge 100 or it may have a radius that approximately matches the body portion 165 (see FIG. 1B) of the non-shouldered cartridge 150.

Figure 7:
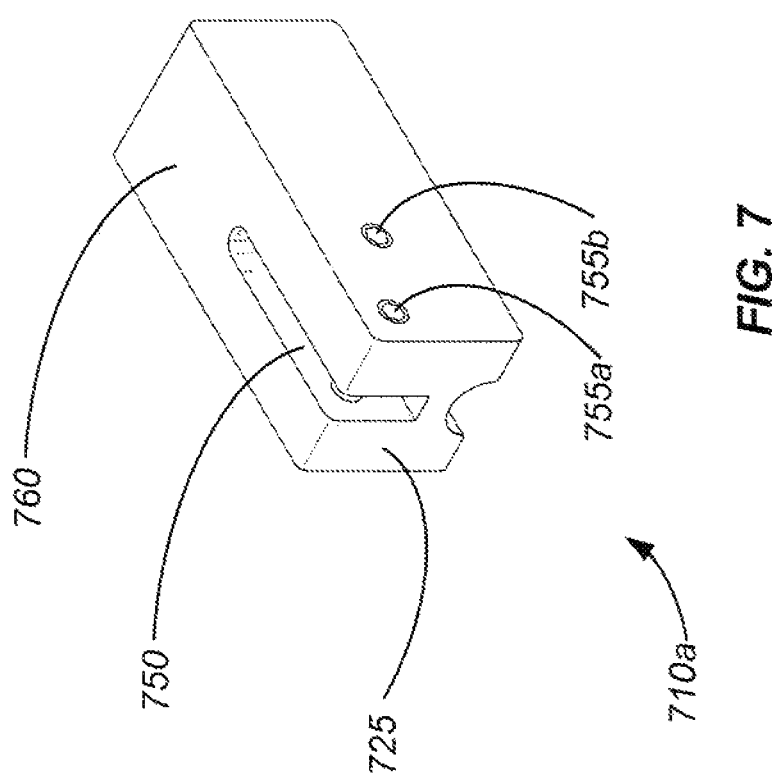
FIG. 7 is a perspective view of a jaw in accordance with the embodiments disclosed herein.

FIG. 7 shows a view of the attachment face of an exemplary jaw 710a. The jaws 210a, 210b, 510a, and 610a depicted above may all have similar features. An attachment face 725 and a rear face 760 may have a slot 750 equipped with one or more fastener features 755a, 755b. The fastener features 755a, 755b may be disposed on one or on both sides of the slot 750.

Figure 8:
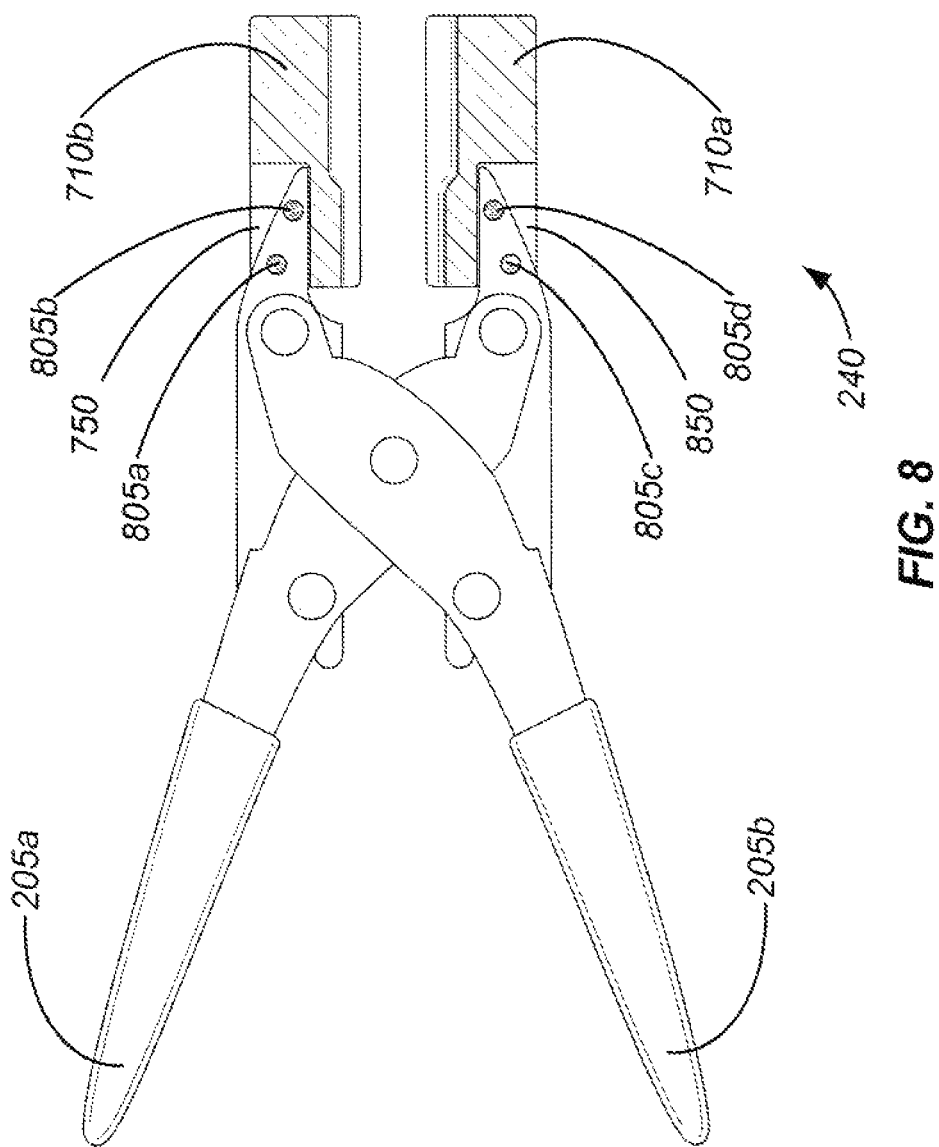
FIG. 8 is an illustration of the tool shown in FIG. 2 with a sectional view through the jaws.

FIG. 8 shows the exemplary jaw 710a and its matched opposing jaw 710b, each jaw mated to the working portion 240 of the corresponding lever arms 205a, 205b, respectively (see FIG. 2) of the tool 200. A portion of the working portion of the lever arms may be received in the slots 750, 850 of the jaws 710a, 710b. The fastener features 755a, 755b (see FIG. 7) of the exemplary jaw 710a may align with one or more lever arm fastener features 805a, 805b. Similarly, the matched opposing jaw 710b may also have fastener features (not shown) that align with one or more lever arm fastener features 805c, 805d.

Myriad fasteners and methods may be employed to attach the jaws to the lever arms without departing from the invention. For example, in one embodiment set screws may be threaded into the jaw fastener features 755a, 755b (see FIG. 7) and be tightened against the lever arm fastener features 805a, 805b, which may be provided as indentations. In another embodiment, set screws with spring-loaded plungers on the ends may be threaded into the jaw fastener features 755a, 755b (see FIG. 7) such that the spring-loaded plungers seat into the lever arm fastener features 805a, 805b, which may be provided as indentations. In another embodiment, a machine screw may be inserted through the jaw fastener features 755a, 755b (see FIG. 7) and be inserted through the lever arm fastener features 805a, 805b and secured by a nut or threaded portion of the jaw. In another embodiment, a pin with a spring-loaded ball, sometimes called a pit pin, may be inserted through the lever arm fastener features and the jaw fastener features. In yet another embodiment, rivets may be used.

In some embodiments, two or more fasteners may be used per jaw 210a, 210b (see FIG. 2) to restrain the jaws from rotation. In other embodiments, only one fastener may be used per jaw. In some embodiments, the attachment of the jaw to the working end 240 (see FIG. 2) of the lever arms 205a, 205b may be designed to facilitate rotation of the jaws. This feature may be used in an embodiment wherein the lever arms are connected by a single primary pivot such that the clamping surfaces of the jaws are not maintained substantially parallel from the open position to the closed position. More specifically, the rotation of the jaws may enable the jaws to self-align on the cartridges 100, 150 (see FIG. 1A, 1B) when the lever arms transition from the open position to the closed position.

Figure 9:
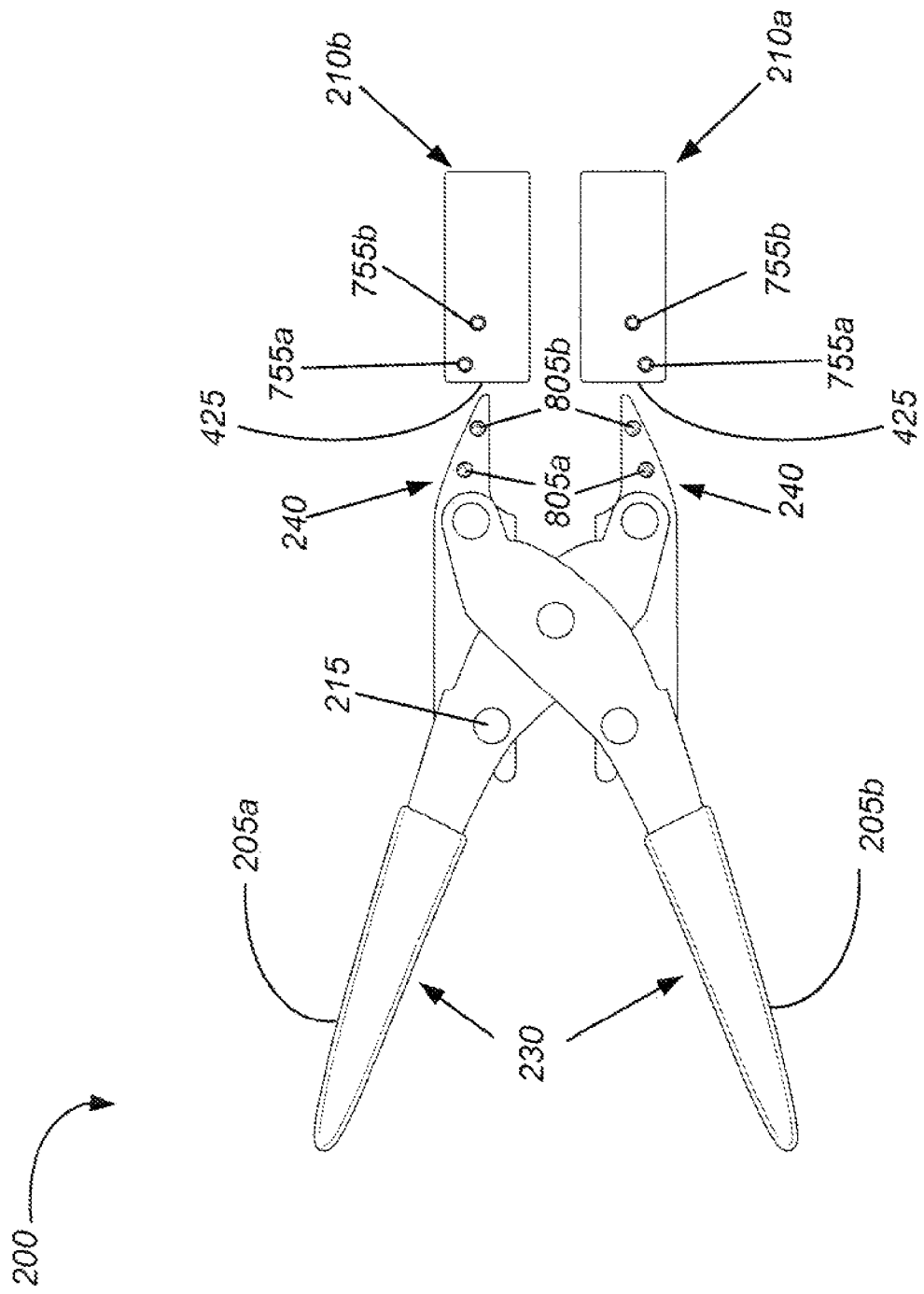
FIG. 9 is a view of the tool illustrated in FIG. 2 shown in the open position with the jaws detached from the lever arms.

FIG. 9 is a view of the tool 200 illustrated in FIG. 2 shown in the open position with the jaws 210a, 210b detached from their respective lever arms 205a, 205b. The jaws are moved laterally from the lever arms, to the right in FIG. 9, in a horizontal position in FIG. 9 that is approximately the same vertical position when attached to their respective lever arms. FIG. 9 shows the jaw fastener features 755a, 755b and the lever arm fastener features 805a, 805b, which are aligned when the jaws are attached to their respective lever arms 205a, 205b. Thus, when jaws 210a, 210b are slid to the left, the attachment face 425 of the jaws fit over the working portion 240 of the lever arms such that the attachment face of the jaws is attached to the lever arms. Other features of the tool 200 are identified with their appropriate reference numerals as described above.

It should be appreciated that the cartridge retention tool 200 described herein is illustrative, and that variations and modifications are possible without departing from the invention. For example, in one embodiment the jaws 210a, 210b are comprised of, for example aluminum, brass or other metal. In another embodiment, the clamping surfaces 405 (see FIG. 4a) of the pair of jaws are at a small inclined angle relative to each other such that the receiving faces 410 are closer together than the attachment faces 425. In another embodiment, the jaws are comprised of, for example, a plastic or composite material. In one embodiment a liner is used in the depression 420 (see FIG. 4A) of the jaws 210a, 210b. In one embodiment the liner is comprised of a material that improves the coefficient of friction between the cartridge 100 and the jaws such as, for example, sandpaper, a series of raised ridges, or a deformable material that at least partially conforms to the cartridge. In another embodiment, the liner may be comprised of a material of lower hardness than the cartridge 100 such that the opportunity for damage to the brass cartridge is reduced. Such materials may be, for example, lead, tin, rubber, plastic, silicone, etc. In another embodiment, the depression 420 in the jaws may be non-circular in shape and may be, for example, octagonal or hexagonal.

In another embodiment, the jaws 210a, 210b may have depressions 420 (see FIG. 4A) formed such that when clamping surfaces 405 are together (see FIG. 4B) when the tool 200 is in the closed position, that there is a controlled amount of compression on the cartridge 100. More specifically, the depressions may be formed to the appropriate dimensions such that no damage can occur to the cartridge, even with a significant force applied to the handle portion 230 of the lever arms 205a, 205b. In some embodiments, the depression 420 may be formed to have similar geometry as the cartridge 100 such that when the jaws are closed, the force of the jaws is substantially uniformly distributed along the length of the cartridge such that no damage occurs to the cartridge. In some embodiments, the jaws 210a, 210b may be interchangeable with other jaws that may fit other cartridges. In some embodiments, the jaws 210a, 210b may be designed to grip the head portion 105 (see FIG. 1A) of the cartridge, enabling the opening 130 of the cartridge to be exposed outside of the jaws.

Figure 10:
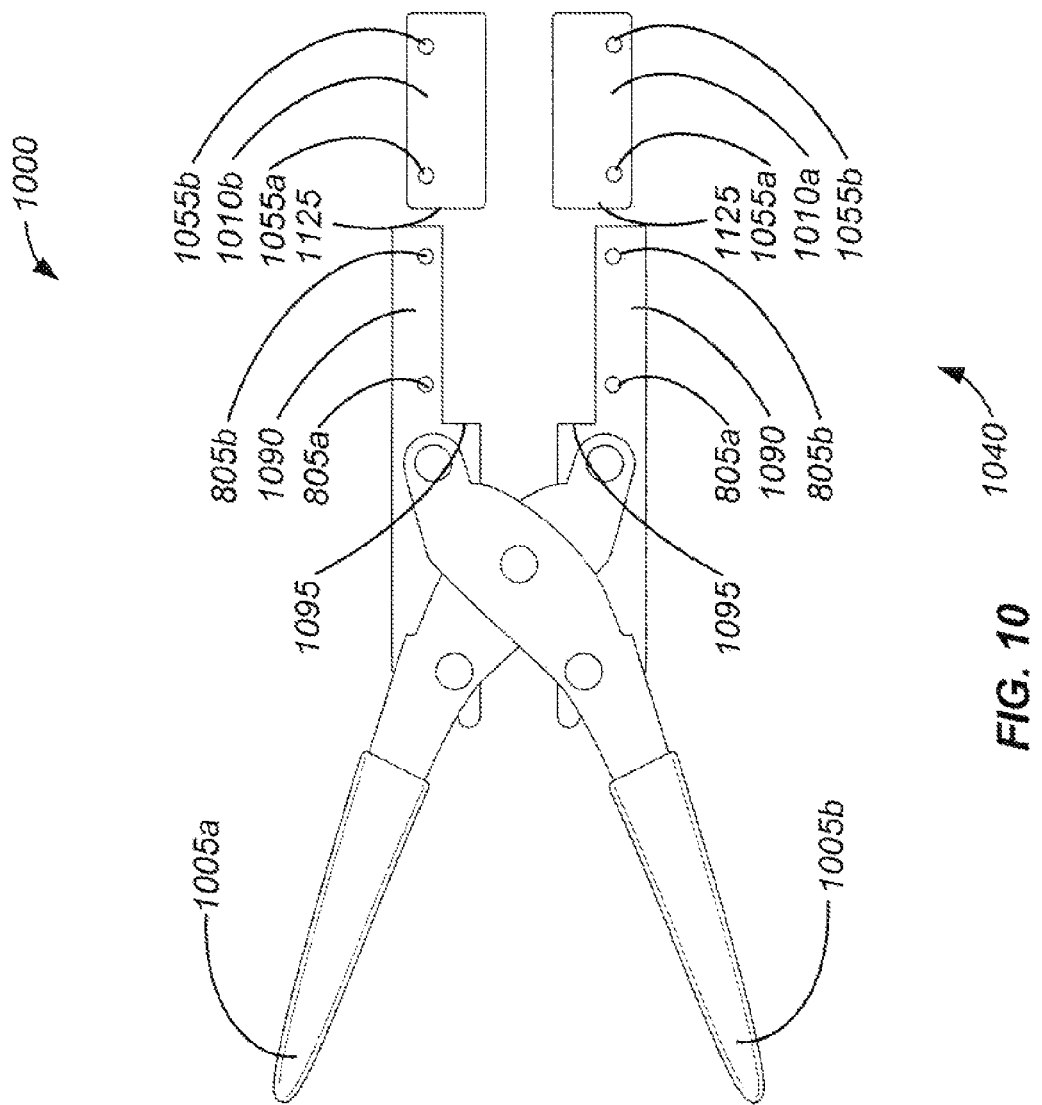
FIG. 10 is a view of a tool for handling a cartridge in accordance with the embodiments disclosed herein, with lever arms in an open position.

An alternative embodiment of a cartridge retention tool 1000 constructed in accordance with this disclosure is illustrated in FIG. 10. This embodiment is the same as the cartridge retention tool 200, illustrated in FIG. 2 above, however this cartridge retention tool 1000 has a different working portion 1040 of lever arms 1005a, 1005b and jaws 1010a, 1010b, as described in more detail below.

The retention tool 1000 is shown in the open position with the jaws 1010a, 1010b detached from their respective lever arms 1005a, 1005b. Each working portion 1040 of lever arms has an elongated attachment beam 1090. Further, each elongated attachment beam 1090 may have a vertical rail 1095 and one or more attachment features 805a, 805b for attaching jaws 1010a, 1010b. The jaws are moved laterally from the lever arms, to the right in FIG. 10, in a horizontal position that is approximately the same vertical position when attached to their respective lever arms. FIG. 10 also shows the jaw fastener features 1055a, 1055b and the lever arm fastener features 805a, 805b, which are aligned when the jaws are attached to their respective lever arms 1005a, 1005b. Thus, when jaws 1010a, 1010b are slid to the left, the attachment face 1125 of the jaws fit over the working portion 1040 of the lever arms such that the attachment face of the jaws is attached to the lever arms. Other features of the tool 1000 are identified with their appropriate reference numerals as described above.

Figure 11:
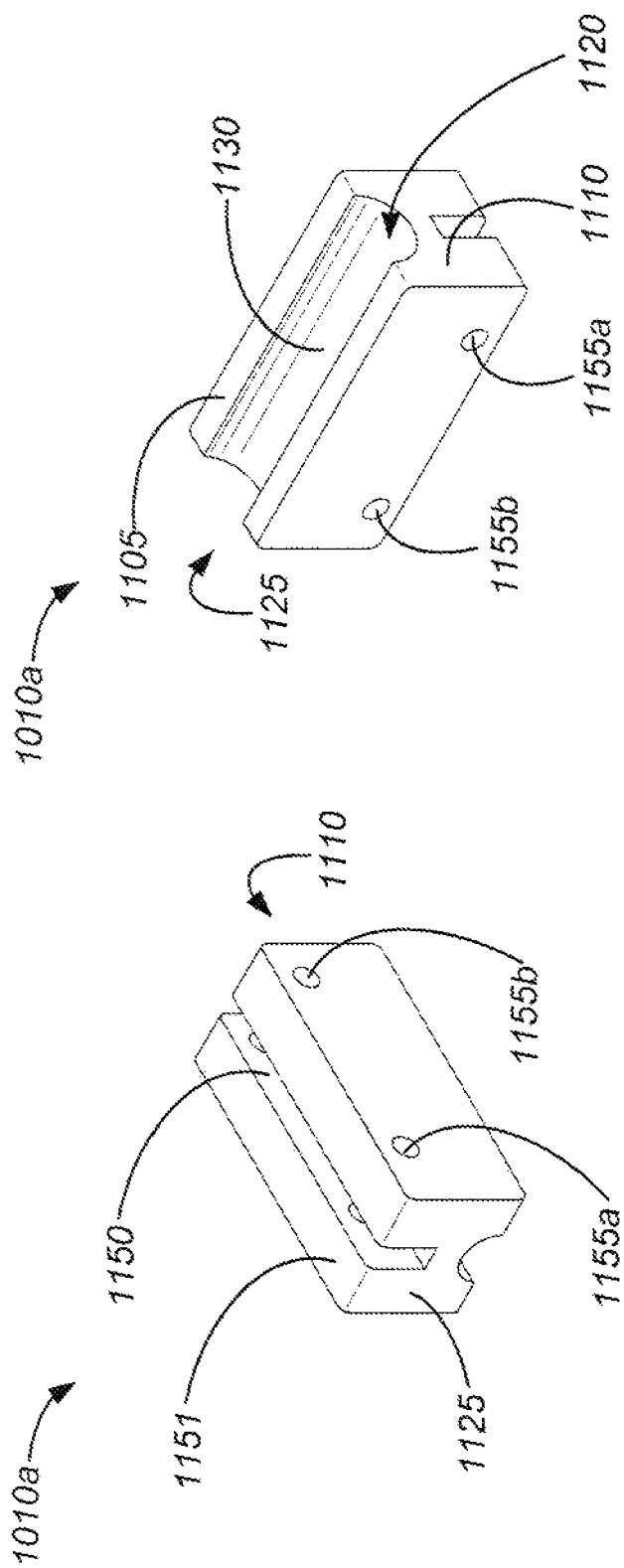
FIG. 11A is a perspective view of a jaw in accordance with the embodiments disclosed herein.
FIG. 11B is a perspective view of a jaw in accordance with the embodiments disclosed herein.

FIG. 11A shows a view of the attachment face 1125 of an exemplary jaw 1010a configured to be employed with the cartridge retention tool 1000. The jaws 210a, 210b, 510a, and 610a depicted above, may all have similar features and may be configured in a similar manner to attach to cartridge retention tool 1000. Jaw 1010a has an attachment face 1125 and a rear face 1151 that may have a slot 1150. The slot 1150 may extend the entire length of the jaw 1010a, along the rear face 1151. The jaw 1010a may also be equipped with one or more fastener features 1155a, 1155b. The fastener features 1155a, 1155b may be disposed on one or on both sides of the slot 1150. Myriad fasteners and methods may be employed to attach the jaws to the lever arms, as illustrate above with reference to FIGS. 7 and 8, without departing from the invention. In one embodiment, the jaw fastener features 1155a, 1155b are thru holes and the lever arm fastener features 805a, 805b are threaded holes, wherein screws are used as fasteners.

As illustrated in FIG. 11B, the jaw 101a may also have a clamping surface 1105 that may have a depression 1120 that approximately matches a profile of the cartridge 100, 150 (see FIGS. 1A and 1B). The depression 1120 may be considered to have a longitudinal axis along which a half-cylinder is disposed. The half-cylinder 1130 may be disposed proximate the receiving face 1110 and may have a radius that approximately matches the radius of the body portion 115 (see FIG. 1A) of the shouldered cartridge 100 or it may have a radius that approximately matches the body portion 165 (see FIG. 1B) of the non-shouldered cartridge 150. Thus, either cartridge 100, 150 may be disposed in depression 1120. Further, either cartridge type may be disposed in the depression 1120 in either orientation. That is, the head portion of either cartridge may be aligned to be adjacent with the attachment face 1125 or with the receiving face 1110. Similarly, jaws of other embodiments may accommodate using cartridges of multiple types I multiple orientations. For example, for the FIG. 6 embodiment, when the tool used, the head portion of a cartridge may be aligned to be adjacent with the attachment face 625, or may be aligned to be adjacent with the receiving face 610.

Figure 12:
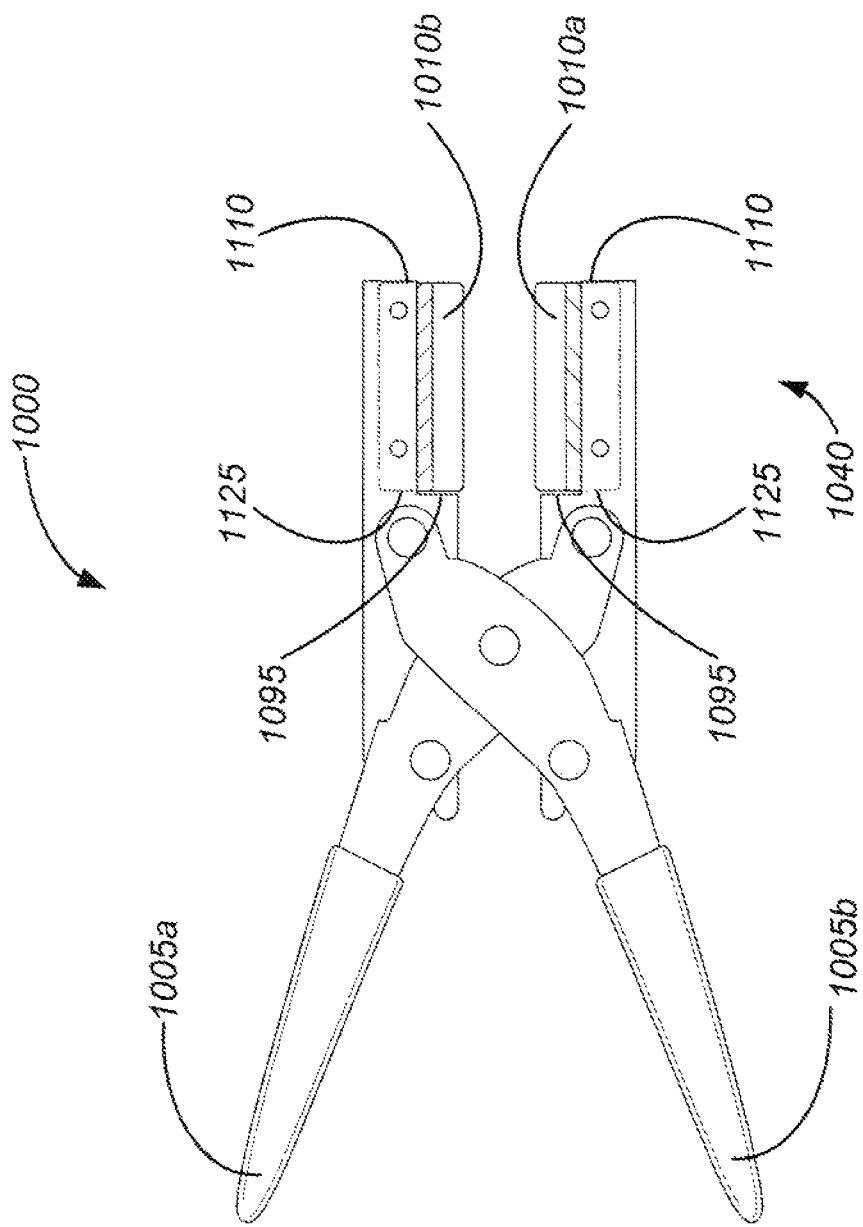
FIG. 12 is a view of a tool for handling a cartridge in accordance with the embodiments disclosed herein, with lever arms in an open position.

A cross-sectional view of a pair of jaws 1010a, 1010b is shown in FIG. 12, attached to the working portion 1040 of the lever arms 1005a, 1005b. In this embodiment, the working portion 1040 of the lever arms 1005a, 1005b may interact with the jaws 1010a, 1010b to create a registration feature that functions similar to the feature 540 illustrated in FIG. 5. More specifically, the vertical rail 1095 may act as a stop to prevent the cartridge 100, 150 from sliding towards the attachment face 1125. The vertical rail 1095 may be located a distance from the receiving face 1110 that is less than a length of the cartridges 100, 150 such that an exposed length 310 (see FIG. 4B) of the head portion 105, 155 or the opening 130, 180 of the cartridges remains outside of the jaws 1010a, 1010b. Thus, when a longitudinal force is applied to the primer pocket 110, 160 of the cartridges 100, 150 (see FIG. 1) during cleaning or other operations, the cartridges may be prevented from sliding towards the attachment face 1125. Similarly, if the cartridges are received in the opposite orientation with openings 130, 180 (see FIG. 1) adjacent to the receiving face 1110, the vertical rail 1095 may stop the cartridges from sliding towards the attachment face 1125 when a longitudinal force is applied to the openings.

Figure 13:
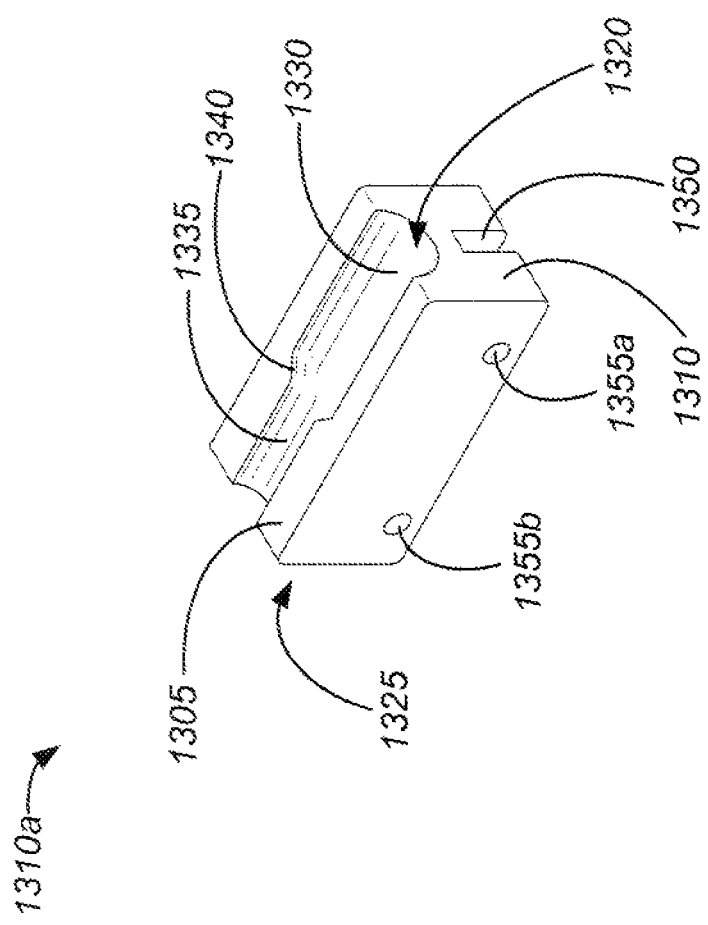
FIG. 13 is a perspective view of a jaw in accordance with the embodiments disclosed herein.

Other jaw designs, as illustrated in FIG. 13 for example, may be employed in this embodiment without departing from the invention. An exemplary jaw 1310*a*, may have an attachment face 1325 that attaches to the working portion 1040 (see FIG. 10) of the lever arm 1005*a*. The jaw 1310*a* may also have a clamping surface 1305 that may have a depression 1320 that approximately matches a profile of the cartridge 100 (see FIG. 1A). The depression 1320 may be considered to have a longitudinal axis along which two half-cylinders are disposed. A first half-cylinder 1330 may be disposed proximate the receiving face 1310 and may have a radius that approximately matches a radius of the body portion 115 (see FIG. 1A) of the cartridge 100. A second half-cylinder 1335 may be disposed towards the attachment face 1325 and may have a radius that approximately matches a radius of the neck portion 125 (see FIG. 1A) of the cartridge 100. The first half-cylinder and the second half-cylinder may be joined by a registration feature 1340. The jaw 1310*a* may further have attachment features 1355*a*, 1355*b* disposed on one or both sides of the slot 1350.

The registration feature 1340 may act as a stop to the cartridge 100, preventing the cartridge from sliding towards the attachment face 1325 when the lever arms are in the closed position for holding the cartridge during cleaning. Further, as depicted in FIG. 12, when the jaw 1310*a* is attached to the lever arm 1005*a*, the vertical rail 1095 of the working portion 1040 may also act as a registration feature. Thus, some embodiments may have more than one registration feature wherein either feature can be used, while other embodiments may employ both features to prevent the cartridge 100 from moving towards the attachment face 1325.

Figure 14:
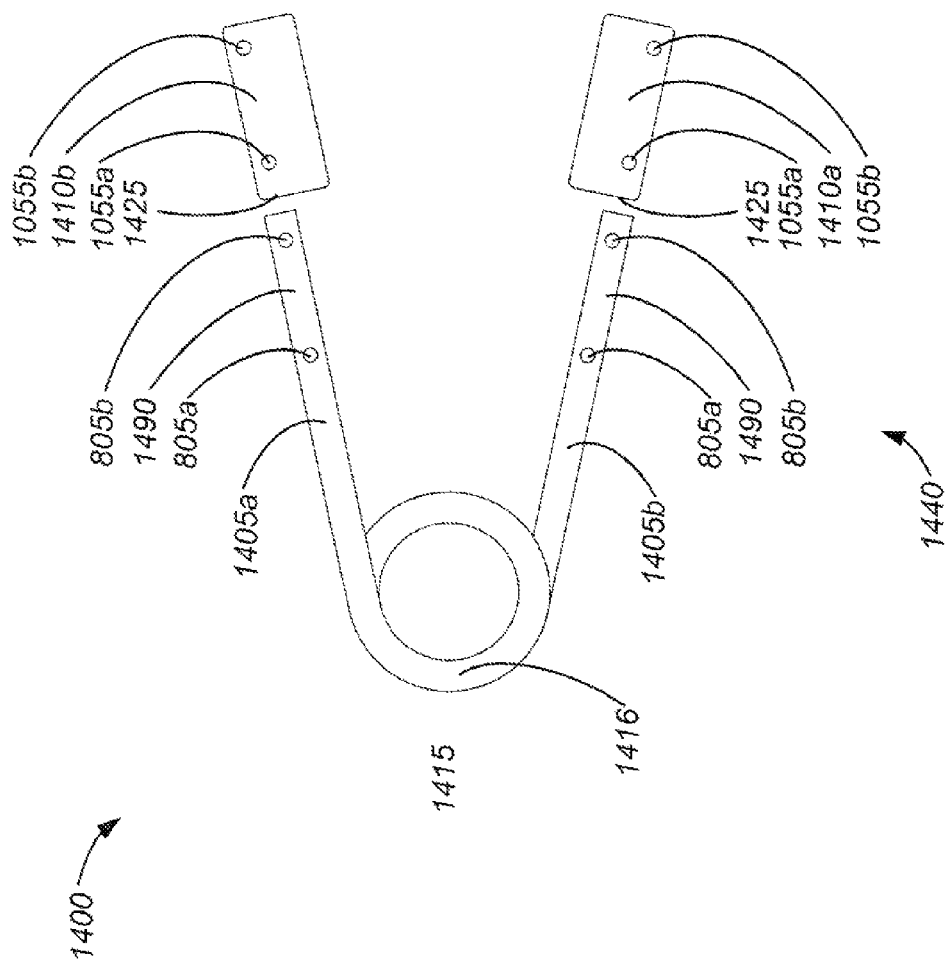
FIG. 14 is a view of a tool for handling a cartridge in accordance with the embodiments disclosed herein, with lever arms in an open position.

An alternative embodiment of a cartridge retention tool 1400 constructed in accordance with this disclosure is illustrated in FIG. 14. This embodiment is somewhat similar to the cartridge retention tool 200, illustrated in FIG. 2 above, however this cartridge retention tool 1400 does not have a handle portion of lever arms 1005*a*, 1005*b* as described in more detail below.

The retention tool 1400 is shown in the open position with the jaws 1410*a*, 1410*b* detached from their respective lever arms 1405*a*, 1405*b*. Each lever arm 1405*a*, 1405*b* is rotably coupled to primary pivot 1415. In some embodiments, primary pivot 1415 may comprise a coil spring, while in other embodiments it may comprise a mechanical pivot mechanism allowing each lever arm 1405*a*, 1405*b* to pivot such that the jaws 1410*a*, 1410*b* may be brought together as illustrated in other embodiments above. Each working portion 1440 of the lever arms has an elongated attachment beam 1490. Further, each elongated attachment beam 1490 may have one or more attachment features 805*a*, 805*b* (as described in more detail above) for attaching jaws 1410*a*, 1410*b*. The jaws 1410*a*, 1410*b* illustrated here are for example only and any jaw discussed above may be used with the retention tool 1400. The jaws are moved outward radially from the lever arms, in FIG. 10, in a position that is approximately the same radial position when attached to their respective lever arms. FIG. 10 also shows the jaw fastener features 1055*a*, 1055*b* (as described in more detail above) and the lever arm fastener features 805*a*, 805*b*, which are aligned when the jaws are attached to their respective lever arms 1005*a*, 1005*b*. Thus, when jaws 1410*a*, 1410*b* are slid radially inward, the attachment face 1425 of the jaws fit over the working portion 1440 of the lever arms such that the attachment face of the jaws is attached to the lever arms. Other features of the tool 1400 are identified with their appropriate reference numerals as described above.

Figure 15:
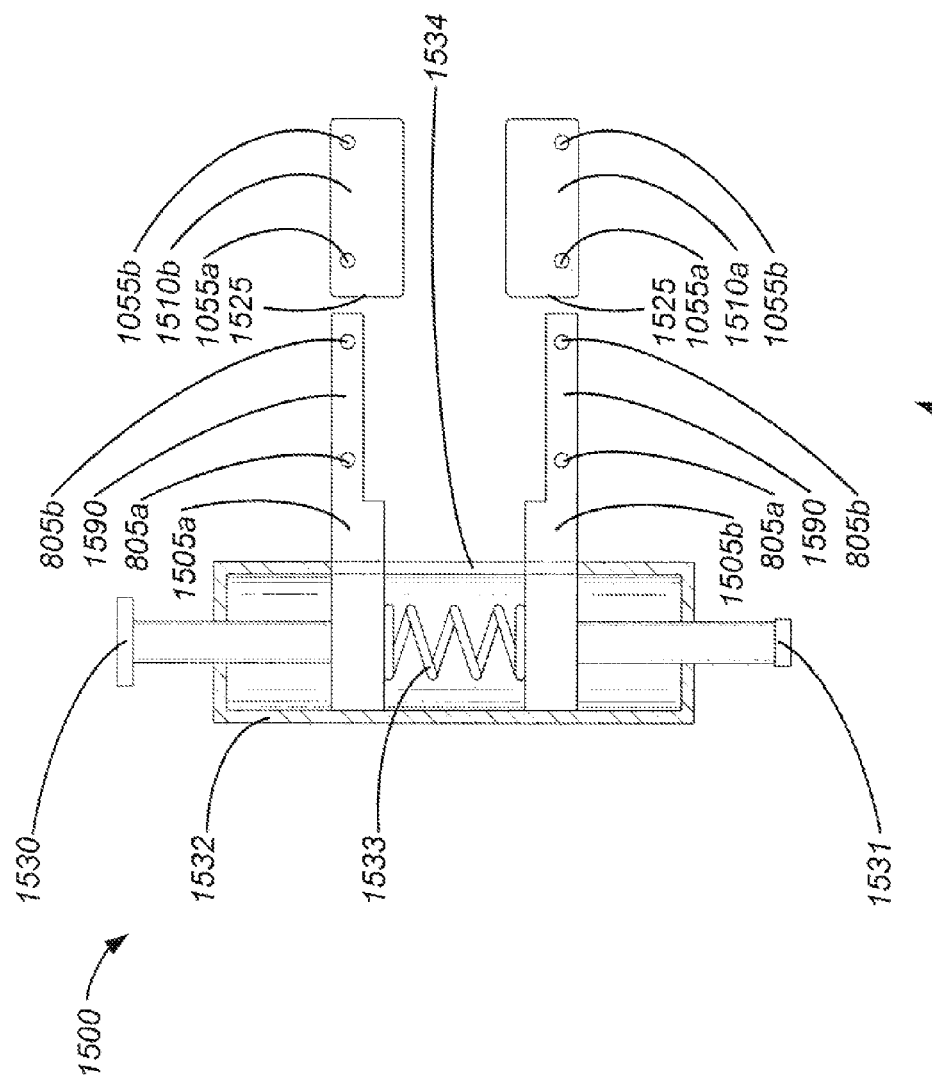
FIG. 15 is a view of a tool for handling a cartridge in accordance with the embodiments disclosed herein, with lever arms in an open position.

An alternative embodiment of a cartridge retention tool 1500 constructed in accordance with this disclosure is illustrated in FIG. 15. This embodiment is somewhat similar to the cartridge retention tool 200, illustrated in FIG. 2 above, however this cartridge retention tool 1500 does not have a handle portion of lever arms 1505*a*, 1505*b* as described in more detail below.

The retention tool 1500 is shown in the open position with the jaws 1510*a*, 1510*b* detached from their respective lever arms 1505*a*, 1505*b*. Each lever arm has a portion disposed within a body 1532, illustrated in cross-section in FIG. 15 for clarity. Plungers 1530, 1531 are attached to each lever arm 1505*a*, 1505*b* such that when the plungers are pushed toward each other, each lever arm also moves toward each other. In some embodiments, a spring 1533 may be disposed between the lever arms 1505*a*, 1505*b* such that the plungers 1530, 1531 and lever arms return to a starting position after being pushed together. In some embodiments, the body 1532 may have a slot 1534 to maintain lever arms 1505*a*, 1505*b* in alignment with each other. Each working portion 1540 of lever arms has an elongated attachment beam 1590. Further, each elongated attachment beam 1590 may have one or more attachment features 805*a*, 805*b* (as described in more detail above) for attaching jaws 1510*a*, 1510*b*. The jaws illustrated here are for example only and any jaws described herein may be employed on retention tool 1500. The jaws are moved laterally from the lever arms, to the right in FIG. 15, in a horizontal position that is approximately the same vertical position when attached to their respective lever arms. FIG. 15 also shows the jaw fastener features 1055*a*, 1055*b* (as described in more detail above) and the lever arm fastener features 805*a*, 805*b* (as described in more detail above), which are aligned when the jaws are attached to their respective lever arms 1505*a*, 1505*b*. Thus, when jaws 150*a*, 1510*b* are slid to the left, the attachment face 1525 of the jaws fit over the working portion 1540 of the lever arms such that the attachment face of the jaws is attached to the lever arms. Other features of the tool 1500 are identified with their appropriate reference numerals as described above.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A hand-held tool for handling a cartridge case, the tool comprising:
    a pair of lever arms, each lever arm having a handle portion located substantially at one end and a working portion located substantially at another end; and
    a pair of jaws, each jaw having an attachment face and a receiving face on opposite sides of the jaw, and a clamping surface that extends between the attachment face and receiving face, wherein one jaw of the pair of jaws is attached to each lever arm such that the attachment face of each jaw is removably attached to the working portion of each lever arm;
    wherein the lever arms are pivotally coupled such that the lever arms move between an open position in which the jaws are spaced apart and a closed position in which the jaws are closer together and the clamping surfaces of the jaws are substantially parallel;
    wherein the clamping surface of each jaw comprises a depression in the shape of a first half cylinder and a second half cylinder that are longitudinally aligned and adjacent one another, each depression having a longitudinal axis oriented perpendicular to the attachment face and the receiving face, and the first half cylinder having a radius that approximately matches a radius of a body of the cartridge case and the second half cylinder having a radius that approximately matches a radius of a neck of the cartridge case;
    wherein the pair of of jaws includes a registration feature disposed a distance from the receiving faces of the pair of jaws that is less than a length of the cartridge case such that when the cartridge case is disposed within the depressions of the pair of jaws the registration feature causes a portion of the cartridge case to protrude from the receiving faces; and
    wherein the registration feature is disposed between the first half cylinder and the second half cylinder and comprises a transition region from the radius of the first half cylinder to the radius of the second half cylinder.

2. A hand-held tool as in claim 1, wherein the clamping surfaces of the pair of jaws are at a small inclined angle when the jaws are attached to respective lever arms, such that the receiving faces are closer together than the attachment faces.

3. A hand-held tool as in claim 1, wherein the pair of jaws when attached to the respective lever arms receive the cartridge case, the cartridge case comprising a substantially cylindrical shape having a head end and an opening end, and wherein the opening end of the cartridge case is substantially receivable in the depressions and the opening end is disposed against the registration feature, and wherein the head end of the cartridge case is disposed a predetermined distance from the receiving face of the pair of jaws.

4. A hand-held tool as in claim 1, wherein each jaw further comprises a slot disposed in a rear surface, the rear surface disposed opposite the clamping surface;
    wherein the slot is sized to receive a portion of the working portion of the lever arm;
    wherein the working portion of each lever arm comprises a fastening feature; and
    one or more removable fasteners disposed at least partially within the pair of jaws, the one or more fasteners mating with the fastening feature to secure each jaw to the working portion of each lever arm.

5. A hand-held tool as in claim 4, wherein the slot is disposed across the entire rear surface of each jaw and the working portion of each lever arm further comprises an elongated beam made to fit in the slot.

6. A hand-held tool for handling a cartridge case, the tool comprising:
    a pair of lever arms pivotally connected at a pivot, each lever arm having a handle portion relative to one side of the pivot and a working portion relative to the other side of the pivot; and
    a pair of jaws, each jaw comprising an attachment face and a receiving face disposed on opposite sides of the jaw and a clamping surface that extends between the attachment face and the receiving face, the attachment face of each jaw removably attached to the working portion of each lever arm;
        wherein the lever arms move between an open position in which the clamping surfaces of the jaws are substantially parallel and spaced apart and a closed position in which the jaws are closer together and the clamping surfaces of the jaws are substantially parallel;
    wherein the clamping surface of each jaw comprises a depression in the shape of two half cylinders of different diameters, each depression having a longitudinal axis oriented perpendicular to the attachment face and the receiving face, and each depression having a radius that approximately matches a radius of the cartridge case; and
    wherein the pair of jaws includes a registration feature configured to position the cartridge case within the jaws such that a portion of the cartridge case rotrudes from the lair of Saws the registration feature disposed a distance from the receiving face of the jaw that is less than a length of the cartridge case.

7. A hand-held tool as in claim 6, wherein the clamping surfaces of the pair of jaws are at a small inclined angle such that the receiving faces are closer together than the attachment faces.

8. A hand-held tool as in claim 6, wherein the pair of jaws receive the cartridge case, the cartridge case comprising a substantially cylindrical shape having a head end and an opening end, and wherein the opening end of the cartridge case is substantially receivable in the depressions and the opening end is disposed against the registration feature, and wherein the head end of the cartridge case is disposed a predetermined distance from the receiving face of the pair of jaws.

9. A hand-held tool as in claim 6, wherein each jaw further comprises a slot disposed in a rear surface, the rear surface disposed opposite the clamping surface;
- wherein the slot is sized to receive a portion of the working portion of the lever arm;
- wherein the working portion of each lever arm comprises a fastening feature; and
- one or more removable fasteners disposed at least partially within the pair of jaws, the one or more fasteners mating with the fastening feature to secure each jaw to the working portion of each lever arm.

10. A hand-held tool as in claim 9, wherein the slot is disposed across the entire rear surface of each jaw and the working portion of each lever arm further comprises an elongated beam made to fit in the slot.

\* \* \* \* \*

UNITED STATES PATENT AND TRADEMARK OFFICE
CERTIFICATE OF CORRECTION

Page 1 of 1

PATENT NO. : 8,915,173 B2
APPLICATION NO. : 13/829654
DATED : December 23, 2014
INVENTOR(S) : David L. Clinton It is certified that error appears in the above-identified patent and that said Letters Patent is hereby corrected as shown below:

In the Claims

Column 11, line 59, in Claim 1, please delete "of of" and insert -- of --

Column 12, line 58, in Claim 6, please delete "rotrudes" and insert -- protrudes --

Column 12, line 59, in Claim 6, please delete "lair" and insert -- pair --

Column 12, line 59, in Claim 6, please delete "Saws" and insert -- jaws --

Signed and Sealed this
Twenty-first Day of July, 2015

Michelle K. Lee
*Director of the United States Patent and Trademark Office*